No. 693,357. Patented Feb. 11, 1902.
E. TYDEN.
TABLE.
(Application filed Feb. 18, 1901.)
(No Model.)
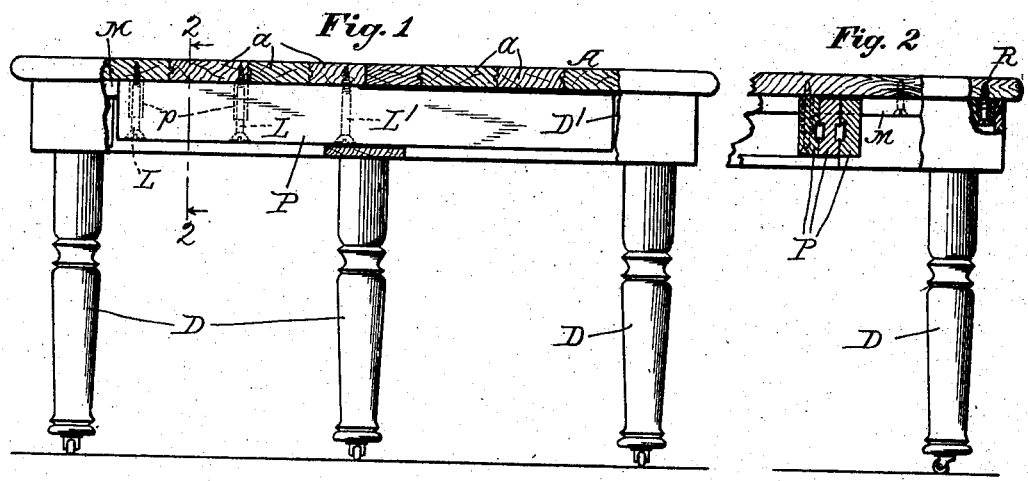
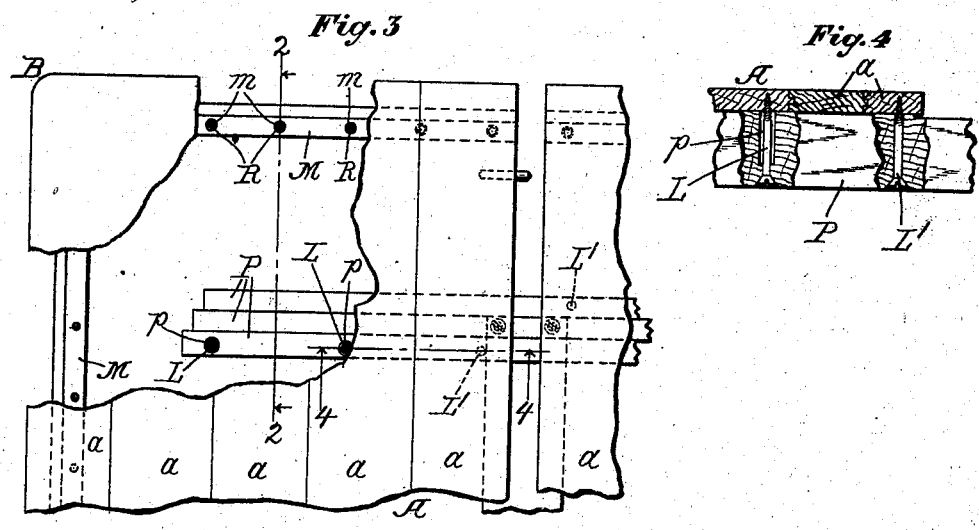
Witnesses:
F. G. Hewitt.
Edward T. Wray.
Inventor:
Emil Tyden.
by Burton & Burton
his Attys.

UNITED STATES PATENT OFFICE.

EMIL TYDEN, OF HASTINGS, MICHIGAN.

TABLE.

SPECIFICATION forming part of Letters Patent No. 693,357, dated February 11, 1902.

Application filed February 18, 1901. Serial No. 47,740. (No model.)

*To all whom it may concern:*

Be it known that I, EMIL TYDEN, a citizen of the United States, residing at Hastings, in the county of Barry and State of Michigan, have invented certain new and useful Improvements in Tables, of which the following is a specification, reference being had to the accompanying drawings, forming a part thereof.

The purpose of this invention is to provide improvements in the construction of tables, particularly in respect to the junctions between the different parts, to overcome certain defects observable in the present construction.

It consists in the structural features set out in the claims.

In the drawings, Figure 1 is a longitudinal section of an extension-table embodying my improvements. Fig. 2 is a detail section at the line 2 2 on Figs. 1 and 3. Fig. 3 is a detail plan of a portion of the same table, the part being partly broken away to disclose details of the structure beneath. Fig. 4 is a detail section at the line 4 4 on Fig. 3.

My invention relates to the joining of several sections or boards of the table-top, more particularly with reference to the means of securing them together by boards or bars which extend crosswise of their abutting edges, operating as cleats to unite said sections. The customary method of joining the sections or several boards of a table-top so as to retain them perfectly abutting and rigid as one continuous board is to apply to the under surface transversely-extending strips or bars secured to each section of the table-top by one or more screws taking through the transverse board or bar into the under side of the section of the table-top. The transverse board or bar is sometimes also screwed to the under surface of the sections which are united by it. The difficulty experienced with this mode of junction and securing the sections of table-tops together is that when tables so made of thoroughly-dried lumber are stored or used in places where they are exposed to a moist atmosphere the boards of the table-top swell and increase in width, while the joining bar or cleat below does not materially increase in length from the same cause. This results in the boards of the table-top bulging up at their junction and, besides making the surface of the table uneven, opens crevices at the upper surface, which are liable to become filled with dust, so that when the boards begin to dry out and shrink to their normal position such material which has lodged in the crevices causes the boards to be crowded apart or prevented from subsiding into their natural position, so that the table is not only temporarily, but permanently, distorted by the effect of the moisture, and in addition the screws which secure the sections of the table-top to the joining-bar below become loosened as the boards warp and bulge upward, so that it never recovers its proper position. This difficulty I overcome by the details of structure which I will now describe. *a a a*, representing the sections or several boards of the table-top, are secured together by the cleats M M, extending on the under side transversely to the sections *a a* in the angle between the table-top and the side moldings B, to which said cleats M are secured by gluing or otherwise, as desired, the cleats serving thereby as a means of securing the molding to the table-top in addition to any other means which may be employed. The sections *a a* are also secured together in extension-tables such as represented in the drawings by one of the slides P P P pertaining to the extension device, whose function as such extension device is well understood and need not be described. One of the set of slides is necessarily secured rigidly to each of the separable parts of the table and may be utilized as the means of securing the sections of that part of the table firmly together in the same manner as the cleat M is utilized for that purpose, in addition to the purpose of securing the molding to the table-top. In each instance (that is, in the case of the cleat M and the slide-bar P) the method of fastening employed and constituting this part of my invention consists in deeply counterboring the screw-holes in the element which operates as a cleat, enlarging it from the end or side next to the sections of the table-top which are to be joined by such cleat, the screw being inserted through from the opposite side and screwed into the section of the table-top, leaving it (that is to say, the screw) without lateral bearing or support for a considerable portion of its length from the surface of the table-top sections back toward the head, so that it is free to bend or spring in that portion of its length in order to permit the section of the table-top which it secures to slide upon the edge of the cleat element whenever swelling or shrinking of the sections of the table-top occurs. Fig. 4 most clearly illustrates this feature of construction in the case of the slide-bar P operating as a cleat to secure the sections $a$ $a$ together, L being a screw which is set through the slide-bar P from the lower edge and screwed into the under surface of one of the sections $a$ of the table-top, the screw-holes being counterbored or enlarged, as shown at $p$, the enlargement extending over about two-thirds of the length of the screw-holes from the side or edge abutting on the under side of the table-top sections which are joined, leaving the remaining third only to afford lateral bearing to the screw shank and head to give the screw fixedness of position at the head in the cleat element—the slide-bar P. Similar provision will be made at all the screw-holes securing the cleat element to the sections $a$ $a$ except L', Fig. 4, nearest the side or edge of the table-top, which, for any reason, it is desired to keep in unchanged relation to the cleat element. Sometimes it will be a matter of indifference in which direction the sliding occurs or which element—that is, the table-top sections or the cleats—moves to accommodate the swelling or shrinking, and in such a case all the screw-holes may be counterbores, as described. Similar construction is shown with respect to one of the cleats M in Fig. 2, wherein R represents the screw, and the counterbore of the screw-hole is seen at $m$. This expedient for the purpose stated involves a detail change from the ordinary method of securing cleats by screws to the parts which they are to bind together in that ordinarily the screw-hole is counterbored at the end at which the screw is inserted, so that the head may sink into the cleat and reach the shoulder upon which it binds as near to the plane of the abutting surfaces of the cleats and joined sections as possible, so that the shortest possible length of screw may intervene between such shoulder and its rigid engagement with the wood in which it is screwed, because by this means a shorter screw may be employed and less insecurity at the junction results from the possible flexibility of the screw or its liability to bend. On the contrary, in my construction it will be noticed that it is desirable to seat the head of the screw at the greater rather than the less distance from the abutting surfaces of the cleat and joined sections, so that the flexibility or capacity for bending of the screw may be utilized to the greater extent in accommodating the movement of the sections upon the cleats due to shrinking and swelling. For this reason in applying my invention the cleats which would in the ordinary construction be laid flat upon the sections which they are to secure together would preferably be placed edgewise, so that the greater depth may be obtained in the direction in which the screw is inserted and more room afforded by the counterbore.

I claim—

1. In a table, a plurality of top-sections in combination with a cleat element joining such sections and screws set through the cleat element into the top-sections respectively; said cleat element having the screw-holes counterbored or enlarged for a substantial distance back from the surface which abuts on the joined sections.

2. In a table, in combination with a plurality of its sections forming the top, a cleat element joining such sections, and screws set through the cleat element into the sections respectively, said cleat element having the holes for the screws taking into the top-sections except one counterbored or enlarged for a substantial distance back from the surface abutting on the joined sections, and the screw-holes taking into the remaining section adapted to afford bearing for the screws throughout the whole extent of the latter in such cleat element.

3. In a table, in combination with a plurality of sections forming the top, an edgewise cleat or joining-bar extending crosswise of the abutting edges of the top-sections, and screws set through the edgewise cleat into the respective sections of the top; the cleat having the screw-holes deeply counterbored or enlarged from the edge next to the joined sections, substantially as and for the purpose set forth.

In testimony whereof I have hereunto set my hand, at Hastings, Michigan, in the presence of two witnesses, this 15th day of February, A. D. 1901.

EMIL TYDEN.

In presence of—
A. C. BROWN,
NORA COOPER.